Sept. 13, 1932.　　　F. M. REID　　　1,877,052
VEHICLE RUNNING GEAR
Filed Nov. 3, 1930　　2 Sheets-Sheet 1
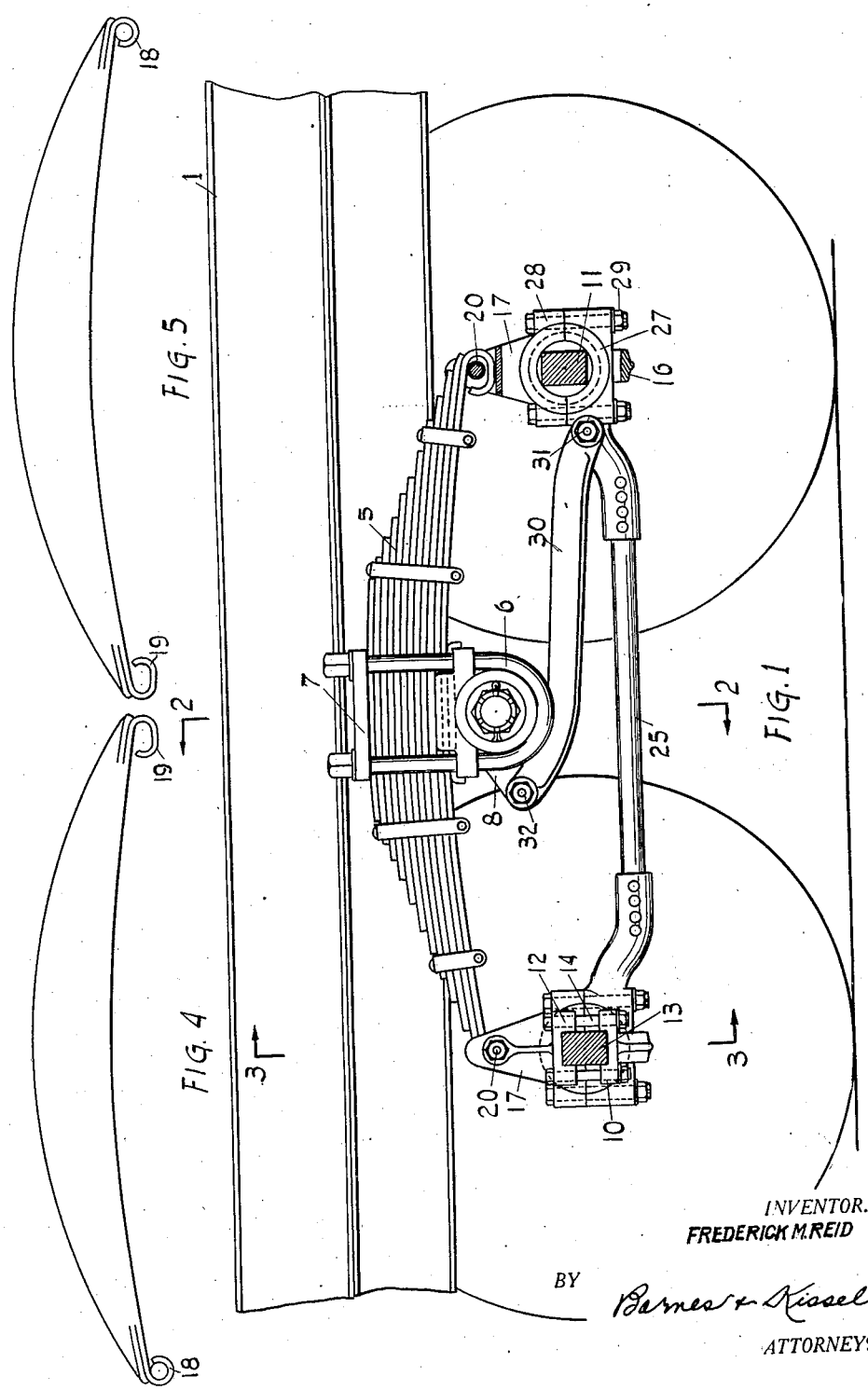
INVENTOR.
FREDERICK M. REID
BY
Barnes & Kisselle
ATTORNEYS Sept. 13, 1932.   F. M. REID   1,877,052
VEHICLE RUNNING GEAR
Filed Nov. 3, 1930   2 Sheets-Sheet 2

INVENTOR.
FREDERICK M. REID
BY
Barnes & Kisselle
ATTORNEYS

Patented Sept. 13, 1932

1,877,052

UNITED STATES PATENT OFFICE

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN

VEHICLE RUNNING GEAR

Application filed November 3, 1930. Serial No. 492,924.

This invention relates to the running gear of a vehicle, and has to do especially with a running gear which employs wheels arranged in tandem. The running gear particularly referred to is adapted for use on trailers, such as a semitrailer wherein the front end of the trailer frame is supported on a truck and the rear end has its own running gear. Obviously however the running gear of this invention is applicable to vehicles generally and not limited to use with trailers.

Among the objects of the invention is the provision of a tandem wheel running gear with a spring suspension for the wheel of a frame. With such a construction movement of the running gear over an irregular roadway and spring flexure effect relative movement of some of the parts. Some of the parts are so arranged and coordinated that in these relative movements opposing forces are minimized and some relative movement minimized resulting in reduction of wear as between these moving parts.

In the accompanying drawings:

Fig. 1 is a side elevational view with some parts cut away illustrating the tandem wheel arrangement.

Figs. 4 and 5 are views showing the relation and position of springs on opposite sides of the vehicle.

Figures 2, 3:
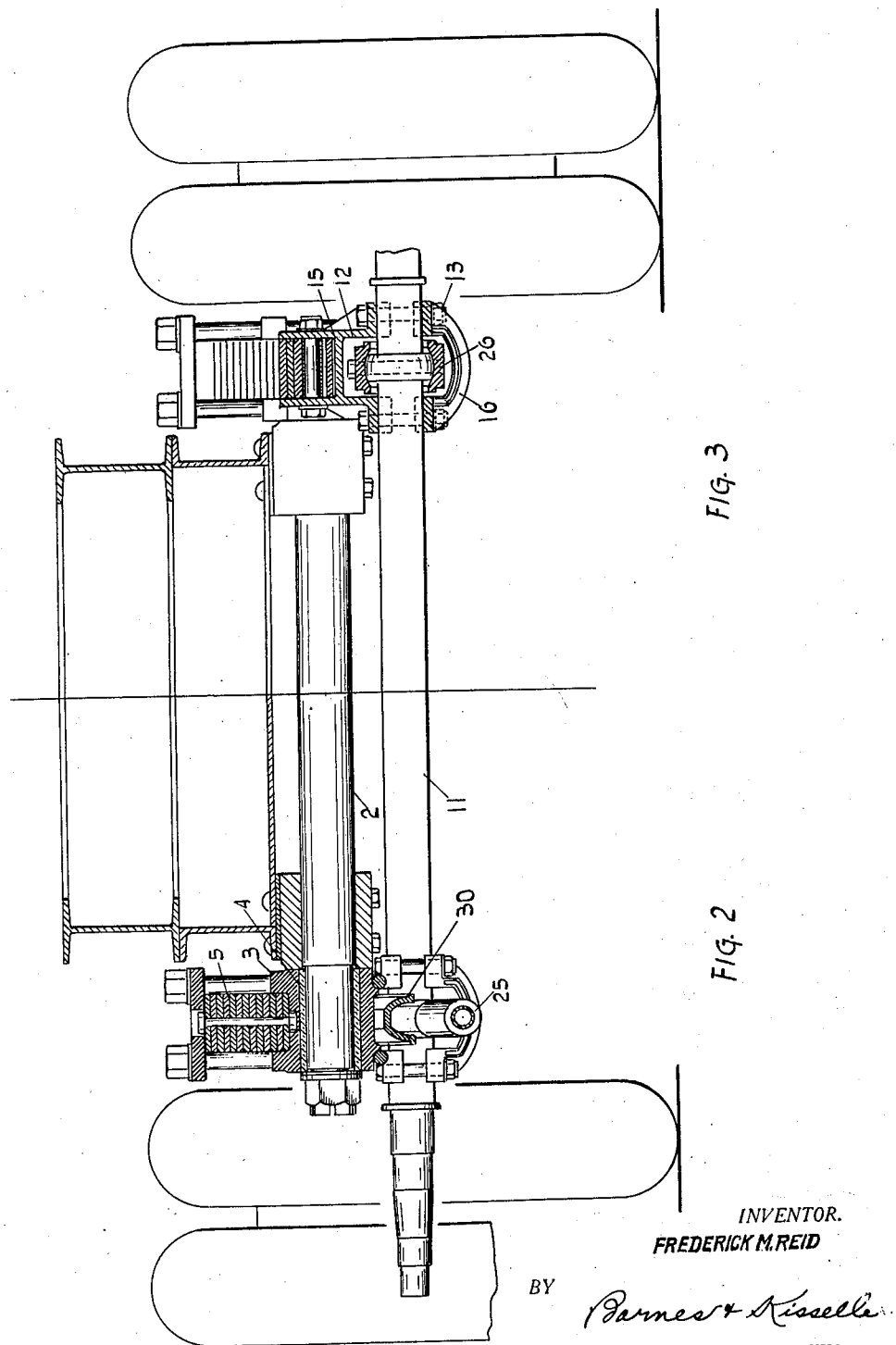
Fig. 2 is a sectional view taken substantially on line 2—2 of Fig. 1.
Fig. 3 is a sectional view taken substantially on line 3—3 of Fig. 1.

The vehicle frame is illustrated at 1, and mounted on the frame is a suitable shaft or bar 2 (Fig. 2) for carrying the springs. This shaft or bar may extend transversely across the vehicle and have a spring mounted adjacent each and at each side of the vehicle. Both sides may be identical, and accordingly it is but necessary to describe only one.

As shown in Fig. 2 the shaft 2 projects beyond the side of the frame, and rockably mounted upon its end is a spring bracket 3. A suitable bearing 4 may be used between the spring bracket and the shaft. A leaf spring 5 is seated upon this bracket and held thereon as by means of U bolts 6 passing underneath the bracket, and a clamping plate 7; thus the spring is mounted to rock upon the shaft 2. The spring bracket 3 has a projecting arm 8 which may be integral therewith, the purpose of which will later be described.

There are two axles 10 and 11 each having wheels at its ends as shown. Spring end brackets are carried by the axles and each bracket may comprise an upper member 12, a lower member 13 clamped to the axle by bolts 14. As shown in Fig. 3 the upper member consists of two spaced parts connected by a cross piece 15 while the lower member has two spaced parts connected to the axle and connected to each other by a bridge 16. This provides a space surrounding the axle located within the spring bracket. Each spring bracket has ears 17, and each spring has a bolt eye 18 adapted to relatively snugly fit a bolt and an elongated bolt eye 19, as shown in Figs. 4 and 5, and spring end bolts 20 pass through the ears and bolt eyes.

The springs and spring eye arrangements on opposite sides of the vehicle may be identical, but the springs on opposite sides of the vehicle are reversed end for end, and disposed as shown in Figs. 4 and 5. In other words, one spring has its elongated eye associated with the rear axle, while the spring on the opposite side of the vehicle has its elongated eye associated with the forward axle.

The two axles are connected together to prevent them from moving toward each other or away from each other and the connecting means comprises a distance rod 25 having its ends connected with the respective axles. The connection between the axles and distance rods is in the form of a ball and socket arrangement, and for this purpose, a spherical or ball like member is mounted upon each axle, and this may be accomplished by permanently uniting this member to the axle, and advantageously locating it so that it comes within the space defined by the spring bracket members (Fig. 3). The distance rod has a rockable connection on this member which may be in the form of a bearing like piece 27 and an opposed cap 28 clamped around the spherical member by bolts 29. The ball like members may be welded to the axle.

Inasmuch as both sides of the vehicle running gear are the same only one is shown. In Fig. 1 it is to be understood that there is a distance rod on each side of the vehicle and both distance rods are connected to the axles in the manner above described. For the purpose of holding the running gear in proper position as regards the frame a radius rod 30 is provided, one on each side of the frame. This radius rod is pivotally connected to the axle as by means of joining it as at 31 to the end piece 27 of the distance rod, and its other end is pivotally connected as at 32 to the arm 8. The radius rod may be U shaped in cross section for at least part of its length to fit over the distance rod.

By this construction it will be appreciated that the axles are free to rock on their axial centers independently of each other and without varying the distance between the axles. In such rocking action relative movement takes place between the bearing member 26 and the connection with the distance rods. The springs hold the axles in normal position; the spring on one side of the vehicle, as illustrated in Fig. 1, holds the axle 10 in normal position by reason of its small bolt eye, while the spring on the other side of the vehicle holds the axle 11 in normal position because it is reversed and in the position shown in Fig. 5.

When the spring flexes under load or due to road irregularities, or both, there is an elongation thereof. When this occurs with the construction shown in Fig. 1, the forward spring eye bolt 20 is pushed forwardly thus rocking axle 10, this being permitted by the elongated eye of the spring on the other side of the vehicle. The same action occurs with axle 11 by the spring on the opposite side of the vehicle which is permitted by the elongated eye of the spring shown in Fig. 1. The axles, however, are maintained in parallelism by the distance rods. The mounting of the radius rod so that it rocks around the fulcrum point of the spring is an important arrangement in connection with the complicated movements which result in operating this construction over a highway. Assume, for example, that the axle 11 is raised with respect to the frame as by means of resting upon a hummock, or by means of the axle 10 lowering when the wheels thereon are in a depression; the spring rocks upon the shaft 2 resulting in the movement of the axles relative to the frame around the shaft 2. Inasmuch as the radius rod has one end connected to rock around a spring mounting, the radius rod holds the axle so that it is caused to move in an arc around the shaft 2. Accordingly, when the spring is caused to rock upon its mounting the radius rod has a similar movement; the result is that the spring and radius rod work in harmony, and there is no binding or relative movement set up by reason of the spring tending to move the axle in one arc and the radius rod tending to move it in another arc. This is not only true when the spring rocks upon its mounting but also true to a large extent when the spring is merely flexed.

I claim:

1. A running gear for vehicles, comprising in combination, a vehicle frame, a spring pivotally mounted near its central portion at each side of the frame and extending lengthwise of the frame, an axle connected to the forward ends of the springs with a tight and loose connection respectively, an axle connected to the rearward end of the springs with a loose and tight connection respectively, distance rods connecting the axles and holding them definitely spaced apart, a radius rod pivotally connected to one axle, and means mounting the other end of the radius rod to pivot around the pivotal mounting of the spring.

2. A running gear of a vehicle comprising in combination, a vehicle frame, a spring extending lengthwise of the frame, means pivotally mounting the spring to the frame, an axle connected to the forward end of the spring, an axle connected to the rearward end of the spring, a distance rod holding the axles definitely spaced apart, a ball and socket connection between each axle and the ends of the distance rods, a radius rod U shaped in cross section pivotally mounted to a distance rod near one end thereof so that part of the distance rod lies within the U shaped radius rod, and means connecting the other end of the radius rod so that the same may pivot around the pivotal mounting of the spring.

3. A running gear of a vehicle comprising in combination, a vehicle frame, a leaf spring on each side of the frame extending lengthwise thereof, means pivotally mounting the springs, a forward axle, a rearward axle, distance rods connected to the axles for spacing them, each spring having at their ends an elongated bolt eye at one end and a small bolt eye at the other, said springs being reversed with respect to each other so that one elongated eye is forward and the other rearward, bolt means passing through said eyes for attaching the spring eyes to the axles, a radius rod connecting an axle, and means securing the radius rod to pivot around the pivotal mounting of a spring.

4. A running gear of a vehicle comprising in combination, a vehicle frame, a leaf spring on each side of the frame extending lengthwise thereof, means pivotally mounting the springs, a forward axle, a rearward axle, distance rods pivotally connected to the axles for spacing them, each spring having at their ends an elongated bolt eye at one end and a small bolt eye at the other, said springs being reversed with respect to each other so that one elongated eye is forward and the other rearward, bolt means passing through said eyes for attaching the spring eyes to the axles, a radius rod connecting an axle, and means securing the radius rod to pivot around the pivotal mounting of a spring.

In testimony whereof I affix my signature.

FREDERICK M. REID.